United States Patent [19]
Dao et al.

[11] Patent Number: 5,115,225
[45] Date of Patent: May 19, 1992

[54] DISK DRIVE UNIT OVERHEATING WARNING SYSTEM

[75] Inventors: Hung D. Dao, Tomball; Thomas W. Grieff, Spring; Thomas W. Lattin, Jr., Houston; Darren R. Thomas, Spring; Stephen M. Schultz, Houston; Richard Ewert, Cypress; David L. Flower, Tomball, all of Tex.

[73] Assignee: Compaq Computer Corporation, Houston, Tex.

[21] Appl. No.: 612,133

[22] Filed: Nov. 13, 1990

[51] Int. Cl.⁵ .......................................... G08B 17/00
[52] U.S. Cl. ................................. 340/584; 340/588; 340/653; 364/185; 371/14
[58] Field of Search ................... 340/584, 588, 653; 364/185; 371/14

[56] References Cited
U.S. PATENT DOCUMENTS 4,823,290  4/1989  Fasack et al. ..................... 340/588
4,922,081  5/1990  Kadwell et al. .................. 340/584

Primary Examiner—Glen R. Swann, III
Attorney, Agent, or Firm—Pravel, Gambrell, Hewitt, Kimball and Krieger

[57] ABSTRACT

Temperature sensors are located inside drive chambers where disk drives are located to signal an overheating condition. An overheating condition triggers external alarms and produces an interrupt signal to the disk drive controller, which, in turn, alerts the operating system. If the operating system does not comprehend the problem and take the appropriate action, the controller shuts down the disk drives after a certain period of time.

8 Claims, 5 Drawing Sheets

DISK DRIVE UNIT OVERHEATING WARNING SYSTEM

BACKGROUND OF THE INVENTION

1. Field of the Invention

The present invention relates to the use of disk drives in computer systems, and more particularly to the incorporation of temperature sensors into disk drive chambers where disk drives are located to detect overheating of the drives.

2. Description of the Related Art

Computer systems are becoming increasingly large and complex and hence require increasing amounts of data storage capability. Computer systems are also being called upon to perform increasingly difficult tasks which require large amounts of data storage to perform properly. This is particularly true of computer systems that serve as file servers in local area networks (LAN's). Additionally, computer systems are being called upon to perform critical tasks which require a high degree of data integrity and reliability. Therefore, a major area of research in the computer industry has been to provide larger and more reliable data storage capabilities for computer systems.

Computer systems that require large amounts of data storage may include several drive bays or drive chambers comprising a plurality of disk drives. A common problem that may occur among disk drives is overheating of the unit. To help alleviate this problem, certain prior systems have included a temperature sensor in the drive area. If the temperature exceeded a predetermined limit, the power supply of the computer was shut down. While this did protect the drive, it also resulted in an unwarned termination of operations, a problem in any system and a major problem on a LAN. Therefore, while the drives were potentially saved by the power shutdown, data in progress may have been lost and opened file problems potentially resulted. Therefore, it is desirable for an apparatus to be able to detect the overheating of a drive and provide a warning to the operating system or an operator prior to shutting down operations.

SUMMARY OF THE INVENTION

A computer system according to the present invention includes temperature sensors which are housed in the respective drive chambers where disk drive storage units are located. Each of the temperature sensors outputs a temperature indication signal to comparison logic which determines whether the current temperature in the respective drive chambers is above certain critical levels. In the preferred embodiment, the comparison logic determines whether the respective temperature in each of the drive chambers is above a first level, preferably 50° C., and above a second, higher level, preferably 62° C., respectively. If the temperature in one of the respective drive chambers is above 62° C., then the comparison logic produces a signal to disable the power supply and shut down the system. If the temperature in one of the drive chambers is determined to be above 50° C. and below 62° C., indicating an overheating problem, then the comparison logic asserts an interrupt signal to the respective controller card in control of the disk drives.

Upon the assertion of the interrupt signal, the local microprocessor on the controller card sets several warning bits in the status word that it returns to the host operating system at the completion of each data transfer. The local microprocessor allows all input/output (I/O) operations to continue, but begins flashing external error indication light emitting diodes (LED's) and flashes a beeper to alert an operator of the overheating condition.

If the host operating system has been designed to comprehend the meaning of the warning bits, then the host operating system takes the appropriate action, which preferably includes initiating an orderly shutdown sequence of the disk drives. However, if the host operating system does not comprehend the warning bits or fails to shut down the drives, and the overheating condition persists for a predetermined period of time, then the local microprocessor on the controller card halts all I/O operations and shuts down the drives on its own. Additionally, as mentioned above, if the temperature in one of the drive chambers exceeds 62 degrees, then power is removed from the system. Therefore, several levels of fault tolerance are included to ensure that the disk drives are shut down when an overheating condition occurs. When the drives have been shut down due to an overheating condition, the external LED's remain lit to indicate an error condition, and the beeper is sounded.

BRIEF DESCRIPTION OF THE DRAWINGS

A better understanding of the present invention can be obtained when the following detailed description of the preferred embodiment is considered in conjunction with the following diagrams, in which.

DETAILED DESCRIPTION OF THE PREFERRED EMBODIMENT

Figure 1:
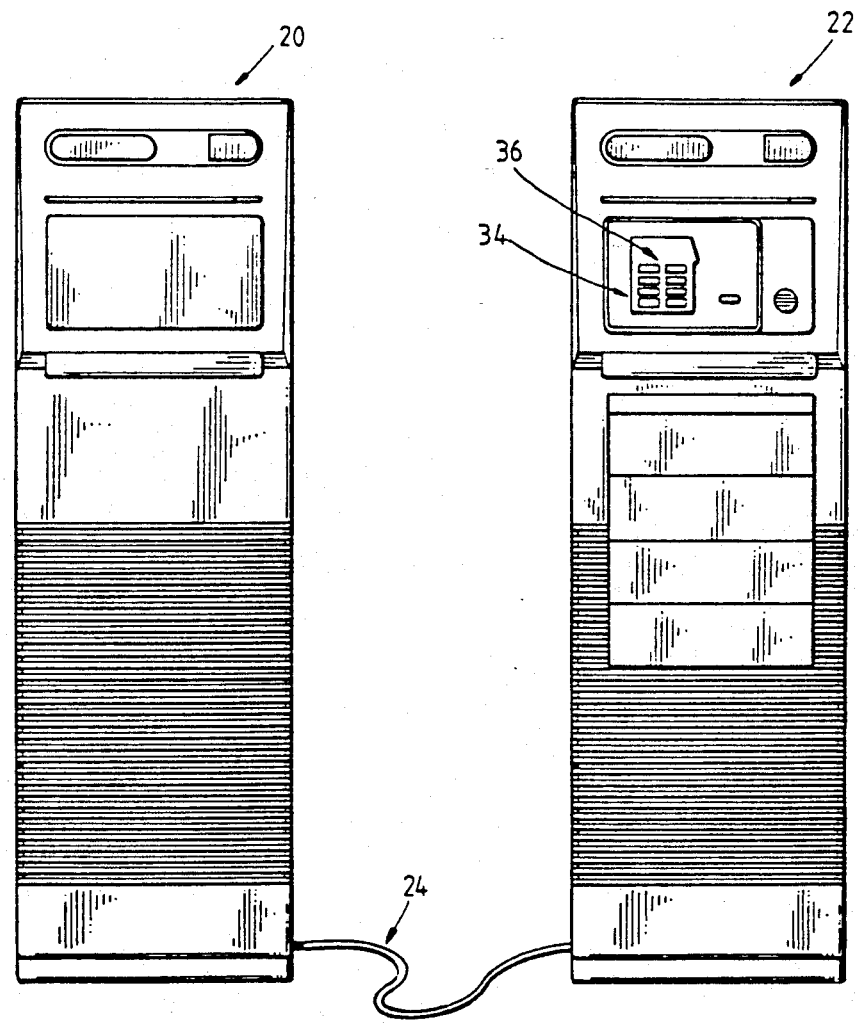
FIG. 1 illustrates a computer system coupled to a data storage unit according to the present invention.

Referring now to FIG. 1, a computer system 20 and a data storage unit 22 are shown. The computer system 20 is preferably a Compaq SystemPro manufactured by Compaq Computer Corporation according to the preferred embodiment, but the use of other computer systems is also contemplated. The computer system 20 includes a microprocessor, an I/O bus, and an operating system, as is standard in computer systems. The computer system 20 includes a controller card according to the present invention which controls the operation of disk drives located in the data storage unit 22. The controller card is preferably compatible with the small computer systems interface (SCSI) bus standard. However, the use of other bus standards is also contemplated.

The data storage unit 22 preferably includes two drive chambers, wherein each drive chamber can preferably hold up to four disk drives. The data storage unit 22 is connected to the computer system 20 through a supplemented SCSI cable 24. The cable 24 is used for transmission of the respective signals forming the SCSI bus between the computer system 20 and the disk drives in the data storage unit 22. The cable 24 also includes several extra wire connections that are not used for SCSI bus signals, but rather are used for transmission of signals according to the present invention, as is explained below.

The data storage unit 22 includes an icon 34 representing a side view of the data storage unit 22. The icon 34 is located on the front of the unit 22. The icon 34 includes eight bicolor light emitting diodes (LED's) which correspond to each of the eight disk drives that may be located in the data storage unit 22. In the preferred embodiment, the respective bicolor LED's 36 are green when their corresponding disk drive is being accessed. In addition, all of the bicolor LED's 36 begin flashing an amber color when an overheating condition is detected in one of the drive chambers. The respective bicolor LED's 36 become a solid amber color when the disk drives have been shut down due to an overheating condition in one of the respective disk drive chambers or an error has occurred on that disk drive.

Figure 2:
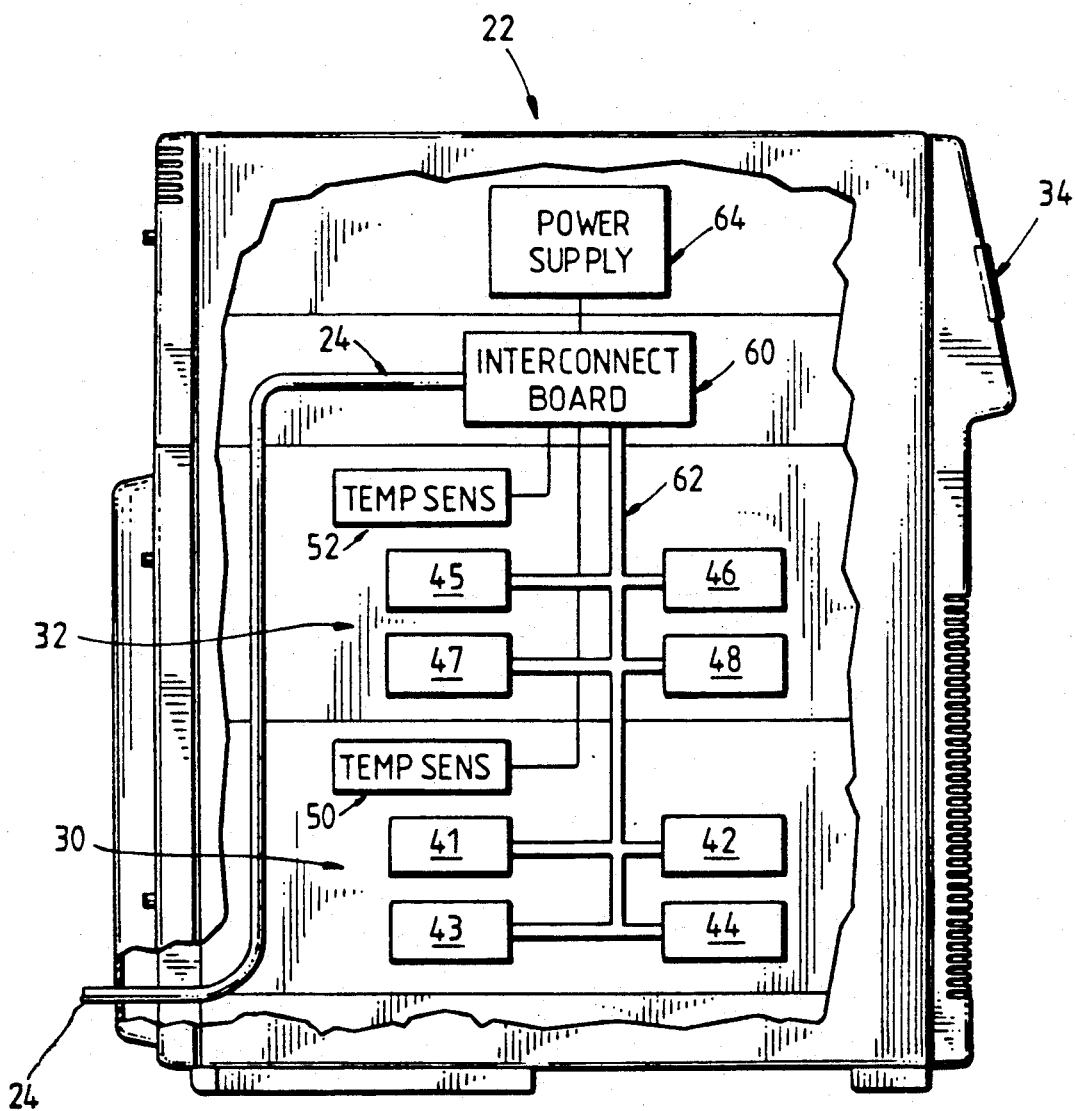
FIG. 2 is a view in partial cross-section of the data storage unit of FIG. 1 including disk drives and an interconnect board according to the present invention.

Referring now to FIG. 2, a side, partial cross-sectional view of the data storage unit 22 is shown. The data storage unit 22 includes two drive chambers 30 and 32 according to the preferred embodiment. The lower drive chamber 30 preferably includes up to four disk drives 41, 42, 43 and 44. The upper drive chamber 32 also preferably includes up to four disk drives 45, 46, 47 and 48. The controller card in the computer system 20 can control up to seven disk drives in the present embodiment. In the preferred embodiment, a first controller card controls the disk drives 41, 42, 43, and 44, and a second controller card may be included in the computer system 20 to control the operation of the disk drives 45, 46, 47, and 48.

The data storage unit 22 includes an interconnect board 60 according to the present invention which is situated in the upper portion of the data storage unit above the two drive chambers 30 and 32. The interconnect board 60 connects with the controller card in the computer system 20 through the cable 24. The interconnect board 60 connects the SCSI bus signals from the cable 24 to a SCSI bus 62 which connects to each of the disk drives 41, 42, 43, 44, 45, 46, 47 and 48.

Each of the drive chambers 30 and 32 includes a respective temperature sensor 50 and 52 according to the present invention. The temperature sensors 50 and 52 generate voltages whose levels are indicative of the sensed temperature. The voltages are provided to the interconnect board 60. The interconnect board 60 is also coupled to a power supply 64, which provides power to the data storage unit 22. The interconnect board 60 also includes logic which controls the bicolor LED's 36 in the icon 34.

Figure 3:
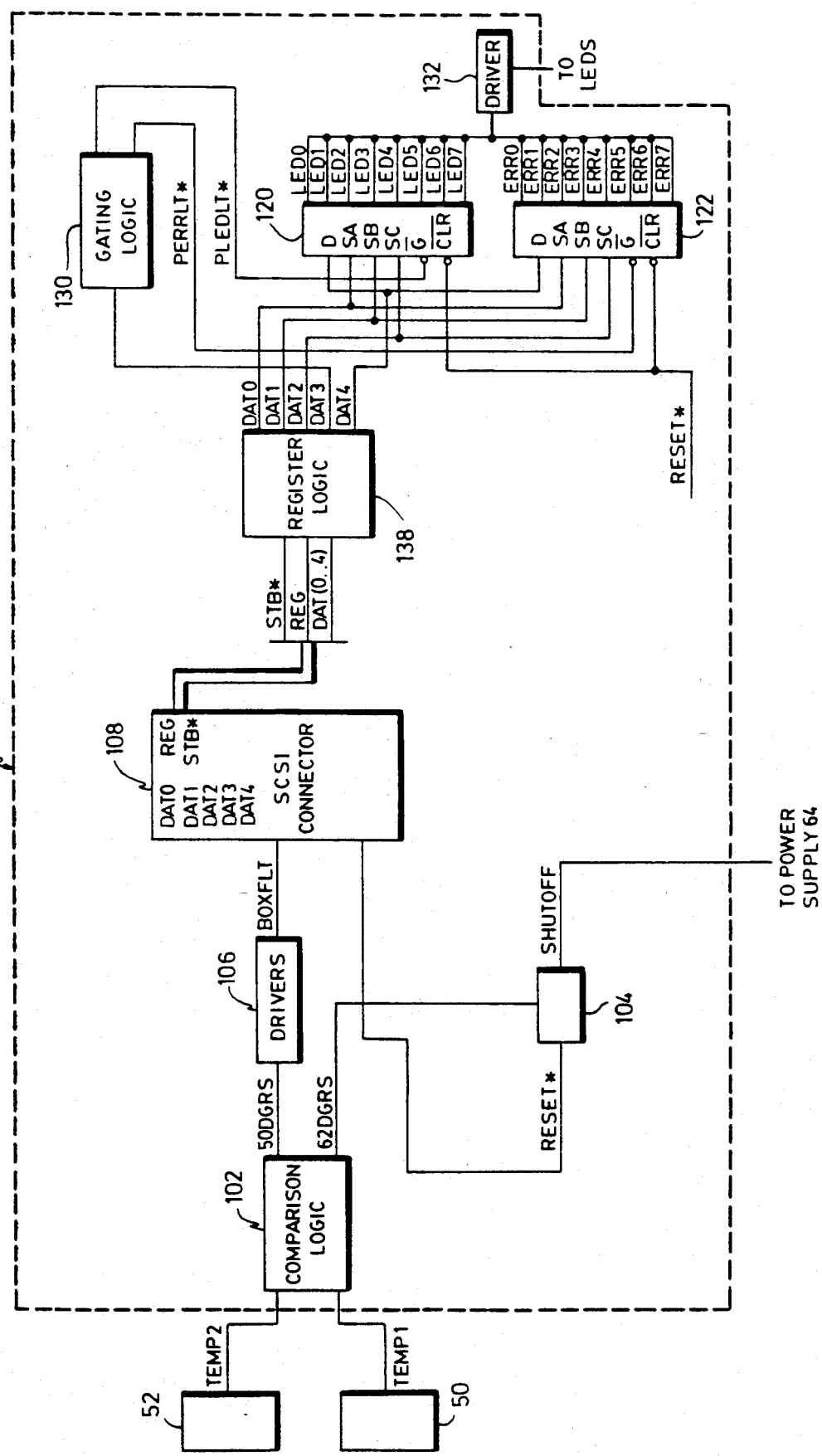
FIG. 3 is a schematic logic diagram of the overheating logic on the interconnect board of FIG. 2 according to the present invention.

Referring now to FIG. 3, the overheating detection and LED control logic located on the interconnect board 60 is shown. The temperature sensors 50 and 52 generate signals referred to as TEMP1 and TEMP2, respectively, that are supplied to the overheating detection logic on the interconnect board 60. The TEMP1 and TEMP2 signals are provided to comparison logic 102. The comparison logic 102 compares the TEMP1 and TEMP2 signals with certain predefined temperature limits to determine whether the respective temperatures in each of the drive chambers 30 and 32 are above these temperature limits. The temperature limits chosen in the preferred embodiment are 50 degrees Celsius and 62 degrees Celsius, but the use of other temperature limits is also contemplated. The comparison logic 102 generates a signal referred to as 50DGRS which indicates, when asserted low, that the temperature in one of the drive chambers 30 or 32 is above 50° C. The comparison logic 102 also generates a signal referred to as 62DGRS which indicates, when asserted low, that the temperature in one of the respective drive chambers 30 or 32 is above 62° C.

The 62DGRS signal is provided to transistor logic 104 which asserts a signal referred to as SHUTOFF to the power supply 64 when the 62DGRS signal is asserted to disable the power supply 64. The power supply 64 generates a voltage that is supplied through a connector on the interconnect board 60 to each of the disk drives 41 through 48. The asserted SHUTOFF signal disables the power supply 64, thereby effectively turning off disk drives 41 through 48 and the unit 22.

The 50DGRS signal is supplied to output drivers 106 which generate a signal referred to as BOXFLT. If multiple SCSI controller cards are configured in the computer system 20, then the drivers 106 will generate a corresponding number of BOXFLT signals for each of the controller cards. The BOXFLT signal is supplied to a connector 108 which is connected to the cable 24. The BOXFLT signal is supplied to the controller card over one of the extra connections in the cable 24, as was explained above.

The connector 108 receives signals from the controller card which control the operation of the bicolor LED's 36 in the icon 34 according to the present invention. These signals are referred to DAT0, DAT1, DAT2, DAT3, DAT4, REG and a strobe signal referred to as STB*. These signals are generated by the controller card in the computer system 20 and are passed through extra connections on the cable 24 to the connector 108 on the interconnect board 60.

The DAT<0..4> signals, the REG signal and STB* signal are provided from the connector 108 to register logic 138. The register logic 138 includes two registers referred to as the index register and the data register. The DAT<0..4> signals are connected to the inputs of the index register and the data register. The REG signal selects between the index register and the data register, and the STB* signal strobes data into the index register or the data register, depending on which register is being accessed. The index register is used to select between whether the LED's 36 or a beeper (not shown) is to be controlled. The data register receives the DAT<0..4> signals on a subsequent write cycle, and the values written to the data register control the operation of either the LED's 36 or the beeper 134, depending on whether the LED's 36 or the beeper were chosen by the first write operation to the index register.

Therefore, when the controller card wishes to turn on or turn off any of the respective LED's 36, it writes a value to the index register which selects the LED's 36. The controller card then writes the appropriate DAT<0..4> signals to the data register, and this data controls which of the LED's 36 are turned on or turned off, as is explained below. The DAT0, DAT1 and DAT2 signals are output from the data register in the register logic 138 and are provided to the SA, SB, and SC inputs of two eight-bit addressable latches 120 and 122. The DAT0, DAT1, and DAT2 signals are used to address bit positions in each of the latches 120 and 122 which correspond to the disk drives 41 through 48 in the data storage unit 22. The bit positions in each of the latches 120 and 122 also correspond to the respective LED's 36 in the icon 34. The addressable latch 120 is used to store information regarding which of the disk drives 41 through 48 are active, and the addressable latch 122 is used to store information regarding which of the disk drives 41 through 48 is currently in an error condition. The latch 120 generates signals referred to as LED<0..7>, which enable the respective bicolor LED to generate a green light, and the latch 122 generates signals referred to as ERR<0..7> which enable the respective LED to generate an amber light. The DAT4 signal is provided to the D inputs of each of the latches 120 and 122. The DAT4 signal is used to set individual bit positions in each of the latches 120 and 122, the bit position depending on the addressing signals DAT0, DAT1, and DAT2.

The DAT3 signal is supplied to gating logic 130. The gating logic 130 generates a signal referred to as PLEDLT*, which is provided to the gating input of the addressable latch 120. The gating logic also generates a signal referred to as PERRLT*, which is provided to the gating input of the addressable latch 122. The DAT3 signal is used to distinguish between whether the respective disk drive 41 through 48 being addressed by the DAT0, DAT1, and DAT2 signals is active or in an error condition. The DAT3 signal thus determines whether the respective LED corresponding to the disk drive being addressed displays a green color, indicating activity, or displays an amber color, indicating an error condition. Therefore, when the DAT3 signal indicates an active condition for the respective disk drive being accessed, the PLEDLT* signal is asserted low, enabling the latch 120 to receive the respective address signals and D input, and the latch 120 asserts the corresponding LED<0..7> signal to produce a green light in the corresponding LED. When the DAT3 signal indicates an error condition or overheating condition for the respective disk drive being accessed, the PERRLT* signal is asserted low, enabling the latch 122 to receive the respective addressing signals and D input, and the latch 122 asserts the corresponding ERR<0..7> signal to produce an amber light in the corresponding LED. The inverted clear inputs of each of the latches 120 and 122 are connected to a RESET* signal which is low until the power in the unit 22 is adequate. Therefore, when the RESET* signal is asserted, the latches 120 and 122 are cleared. The LED<0..7> signals and the ERR<0..7> signals are provided to inputs of a driver 132 which provides these signals to the respective bicolor LED's 36.

Figure 4:
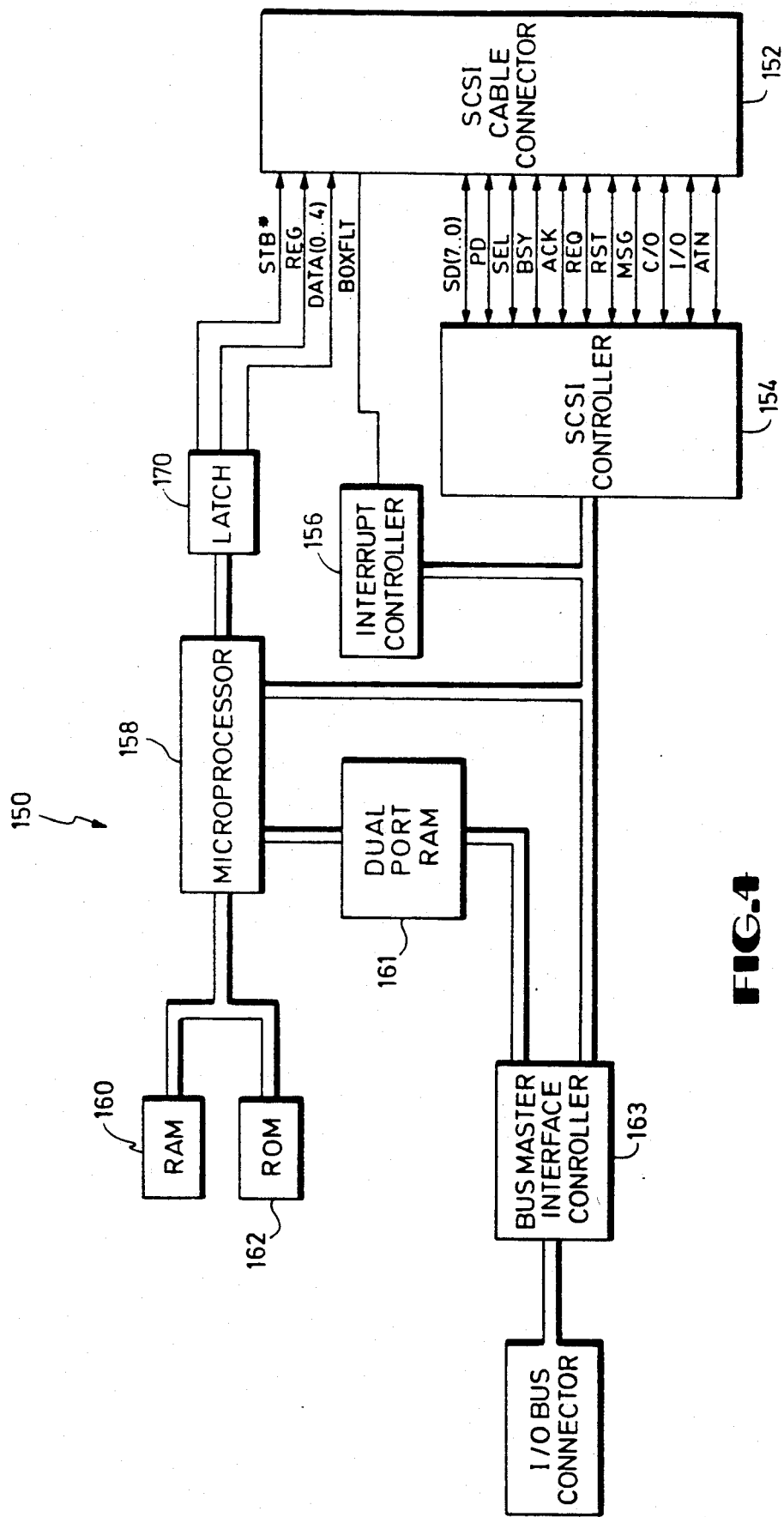
FIG. 4 is a schematic block diagram of a controller card located in the computer system of FIG. 1 according to the present invention.

As previously discussed, when an overheating condition is detected in one of the drive chambers 30 or 32, the BOXFLT signal is asserted and provided through the connector 108 and the cable 2 to the controller card in the computer system 20. Referring now to FIG. 4, a block diagram of the preferred controller card 150 according to the present invention is shown. The controller card 150 includes a connector 152 similar to the connector 108 of FIG. 3. The connector 152 receives the SCSI bus signals and provides these signals to a SCSI controller 154, which, in turn, provides these signals to an interrupt controller 156 and a local microprocessor 158 on the controller card 150. The connector 152 also receives the BOXFLT signal and provides this signal to the controller card 150 and receives the DAT<0..4> signals, the REG signal, and the STB* signal from the controller card 150 and provides these signals to the cable 24.

The local microprocessor 158 is preferably an 80286 microprocessor from Harris Semiconductor according to the preferred embodiment, but the use of other types of microprocessors is also contemplated. Random access memory (RAM) 160 and read only memory (ROM) 162 are coupled to the local microprocessor 158. The local microprocessor 158, interrupt controller 156, and SCSI controller 154 are preferably coupled together and the interrupt controller 156 and the local microprocessor 158 are coupled, to a bus master interface controller (BMIC) 163 which connects to the host I/O bus. A dual port RAM 161 is preferably coupled between the microprocessor 158 and the BMIC 163. The dual port RAM 161 is used for passing command and status information between the local microprocessor 158 and the host system. In the preferred embodiment, the host I/O bus is the Extended Industry Standard Architecture (EISA) bus and the BMIC 163 is preferably the 82355 from Intel Corporation. The local microprocessor 158 communicates with a latch 170 which provides the DAT<0..4> signals, the REG signal, and the STB* signal to the connector 152.

The BOXFLT signal is provided from the connector 152 to the interrupt controller 156. Upon receiving the asserted BOXFLT signal, the interrupt controller 156 interrupts the local microprocessor 158 to inform it of the overheating condition. In response to the overheating interrupt, the local microprocessor 158 executes a software program or task stored in the ROM 162. The program sets a flag indicating the overheating condition and initiates the countdown of a timer referred to as the overheating duration timer. The overheating duration timer is used to determine if the overheating condition persists for a certain period of time. The overheating duration timer may be set to any initial value according to the present invention. If the overheating duration timer counts down to zero and the overheating condition still persists, then the controller card 150 takes the appropriate action, as is explained below. The overheating duration timer counts independently of any software programs or task executed by the local microprocessor 158.

Figure 5:
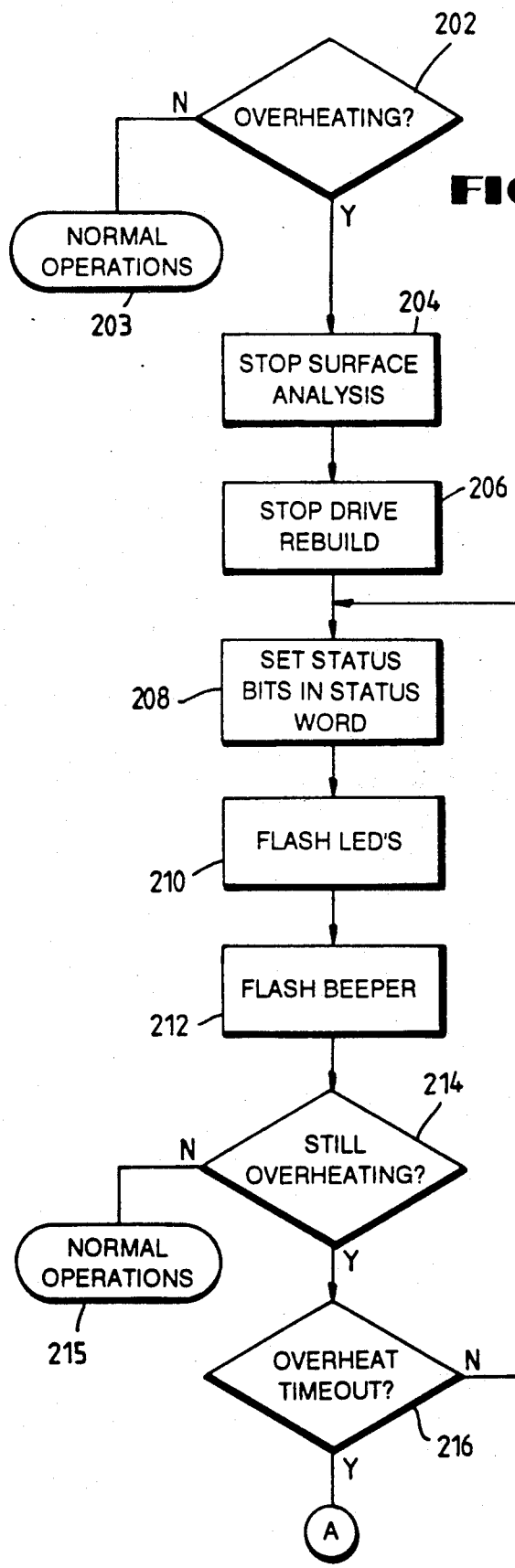
FIGS. 5 and 6 are a flowchart diagram illustrating the shutdown sequence performed by the local microprocessor on the controller card of FIG. 4 according to the present invention.
Figure 6:
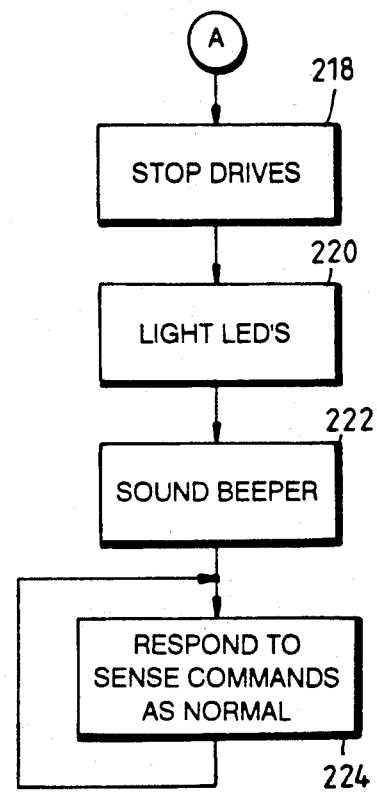

Referring now to FIGS. 5 and 6, a flowchart diagram illustrating operation of the local microprocessor 158 when an overheating condition is detected is shown. For clarity, the flowchart is shown in two portions, with interconnections between FIGS. 5 and 6 designated by reference to the circled letter A. In step 202, the status of the overheating flag is checked. If the flag is not set, the local microprocessor 158 performs normal operations, as shown in step 203. When the overheating flag is set, the local microprocessor 158 executes the software program in steps 204 through 224. It is noted that the local microprocessor 158 is preferably operating under a local, realtime, multitasking operating system and that the indicated program is one task which is executing periodically as determined by the local operating system. Other concurrent tasks include the program discussed above which sets the overheating flag and initiates the overheating duration timer, and normal operations.

The set flag advances the local microprocessor 158 to step 204. In step 204, the processor 158 stops any surface analysis operations that it may be performing. The controller 150 preferably includes a feature which enables it to test the integrity of data stored on the disk drives 41 through 45 when the services of the controller 150 are not being used. The surface analysis feature is disabled in step 204 to prevent any tests from being performed while an overheating condition is occurring. In step 206, the local microprocessor 158 halts a drive rebuild operation if one is in progress. The controller 150 preferably includes a feature which enables it to restore data "lost" from a failed drive using parity or mirror data from the remaining drives, this operation being referred to as a drive rebuild. If a drive rebuild operation is in progress when an overheating condition is detected, this operation is halted in step 206.

In step 208, the local microprocessor 158 sets two bits referred to as NON_FATAL_ERROR and CATASTROPHIC_WARNING in the request status word that it returns to the host operating system in control of the computer system 20 at the end of each data transfer. The CATASTROPHIC_WARNING bit is a specially defined bit which signifies that an overheating condition is occurring. The NON_FATAL_ERROR bit informs the host operating system that the overheating duration timer has not counted down to zero, and therefore that I/O operations are allowed to continue. Together, these warning bits alert the host operating system of the overheating condition. If the host operating system has been designed to comprehend the meaning of the CATASTROPHIC_WARNING bit, then the host operating system will preferably take the appropriate action, which may include an orderly shut down of the disk drives or any other action which is necessary. If the host operating system is not designed to comprehend the meaning of the CATASTROPHIC_WARNING bit and therefore does not recognize that an overheating condition is occurring, then the countdown of the overheating duration timer will trigger action by the controller 150, as explained below.

In step 210, the local microprocessor 158 begins flashing the LED's 36 to signal to an operator that an overheating condition is occurring. The local microprocessor 158 flashes the amber LED's 36 by periodically turning on and turning off the LED's 36. This is accomplished by the local microprocessor 158 writing the appropriate values to the DAT<0..4> bits, the REG bit, and the STB* bit, as was explained above. In step 212, the local microprocessor 158 begins flashing the beeper to audially alert the operator that an overheating condition is occurring.

In step 214, the local microprocessor 158 checks the status of the BOXFLT signal to determine if the overheating condition is still occurring. This is preferably done by reading the status of the respective BOXFLT interrupt bit via the interrupt controller 156. If not, then the local microprocessor 158 returns to normal operations in step 215, resets the overheating duration timer, and clears the overheating flag. If the overheating condition is still occurring, then the local microprocessor 158 proceeds to step 216 and determines if the overheating duration timer has counted down to zero. If the overheating duration timer has not counted down to zero, then the local microprocessor 158 returns to step 208. This step is provided so that if the operating system did not comprehend the meaning of the CATASTROPHIC_WARNING bit and therefore did not effect an orderly shut down of the disk drives a shutdown occurs in any event. The local microprocessor 158 proceeds to step 218 (FIG. 6) where it halts operation of the disk drives 41, 42, 43, and 44 under its control. The local microprocessor 158 then lights the LED's 36 in continuous amber in step 220 to indicate that the drives have been shut down and continuously sounds the beeper in step 222. In step 224, the local microprocessor 158 accepts I/O commands, but does not perform the command and returns the status word with the FATAL_ERROR bit set. The local processor 158 continues to respond to Sense commands from the host operating system. Sense commands are commands by the operating system which request the status of respective drives and the controller. If the host operating system generates an identify unit status command at this time, the local microprocessor 158 returns the status word with a bit referred to as LOG_VOL_BOX_OVERHEATED in the status word set.

Therefore, the present invention includes a temperature sensor located in a drive chamber where disk drives are located which detect when an overheating condition occurs among any of the disk drives. An overheating condition triggers external alarms and produces an interrupt signal to the disk drive controller which, in turn, alerts the host operating system. The controller shuts down the disk drives after a certain period of time, which is important if the host operating system does not comprehend the problem and fails to take the appropriate action. If the temperature in any of the drive chambers exceeds 62 degrees, then power is removed from the data storage unit.

The foregoing disclosure and description of the invention are illustrative and explanatory thereof, and various changes in the size, shape, materials, components, circuit elements, wiring connections, and contacts, as well as in the details of illustrated circuitry and construction may be made without departing from the spirit of the invention.

We claim:

1. An apparatus for detecting overheating in a disk drive chamber, the disk drive chamber including one or more disk drives, the disk drives coupled to a disk drive controller which is in communication with an operating system, the apparatus comprising:
    means located in the drive chamber for sensing the temperature in the drive chamber and generating a signal indicative thereof;
    comparing means coupled to said temperature sensing means which receives said temperature indicating signal for determining if the drive chamber temperature is above a limit temperature indicative of overheating and for generating a signal indicative thereof;
    an external indicating alarm;
    means coupled to said comparing means which receives said limit indicating signal and generates an interrupt signal; and
    means on the disk drive controller coupled to said external indicating alarm and said interrupt signal generating means and receiving said interrupt signal for triggering said external indicating alarm and communicating the overheating status to the operating system when said overheating is detected.

2. The apparatus of claim 1, wherein said disk drive controller further includes:
    an overheating duration timer which counts a predetermined period of time;
    means coupled to said overheating duration timer and said interrupt signal generating means for beginning said timer when said interrupt signal is asserted; and means coupled to said overheating duration timer and the disk drives for disabling the disk drives if said interrupt signal continues until said predetermined period of time has elapsed.

3. The apparatus of claim 2, wherein said disk drive controller further includes:
means coupled to said overheating duration timer and said interrupt signal generating means for resetting said overheating duration timer if said interrupt signal is negated.

4. The apparatus of claim 2, wherein said disk drive controller flashes said external indicating alarm while said overheating duration timer is counting; and
wherein said disk drive controller continuously asserts said external indicating alarm when said predetermined period of time has elapsed.

5. The apparatus of claim 4, wherein said external indicating alarm comprises a beeper and at least one light emitting diode.

6. The apparatus of claim 1, wherein said comparing means further determines if the drive chamber temperature is above a second limit temperature, said second limit temperature being greater than said first-recited limit temperature, and generates a signal indicative thereof; the apparatus further comprising:
power supply means which supplies power to the disk drives having an input for receiving said second limit temperature indicating signal, wherein said power supply means is disabled when said drive chamber temperature is above said second temperature as indicated by said second limit temperature indicating signal.

7. An apparatus for detecting overheating in a device chamber, the device chamber including one or more devices, the devices coupled to a device controller which is in communication with an operating system, the apparatus comprising:
means located in the device chamber for sensing the temperature in the device chamber and generating a signal indicative thereof;
comparing means coupled to said temperature sensing means which receives said temperature indicating signal for determining if the device chamber temperature is above a limit temperature indicative of overheating and for generating a signal indicative thereof;
means coupled to said comparing means which receives said limit indicating signal and generates an interrupt signal; and
means on the device controller coupled to said interrupt signal generating means and receiving said interrupt signal for communicating the overheating status to the operating system when said overheating is detected.

8. The apparatus of claim 7, further comprising:
an external indicating alarm;
wherein said device controller means is coupled to said external indicating alarm and triggers said external indicating alarm when said overheating is detected.

* * * * *